Nov. 18, 1930.   T. A. HODGES ET AL   1,781,756
OIL GAUGE
Filed Dec. 5, 1925
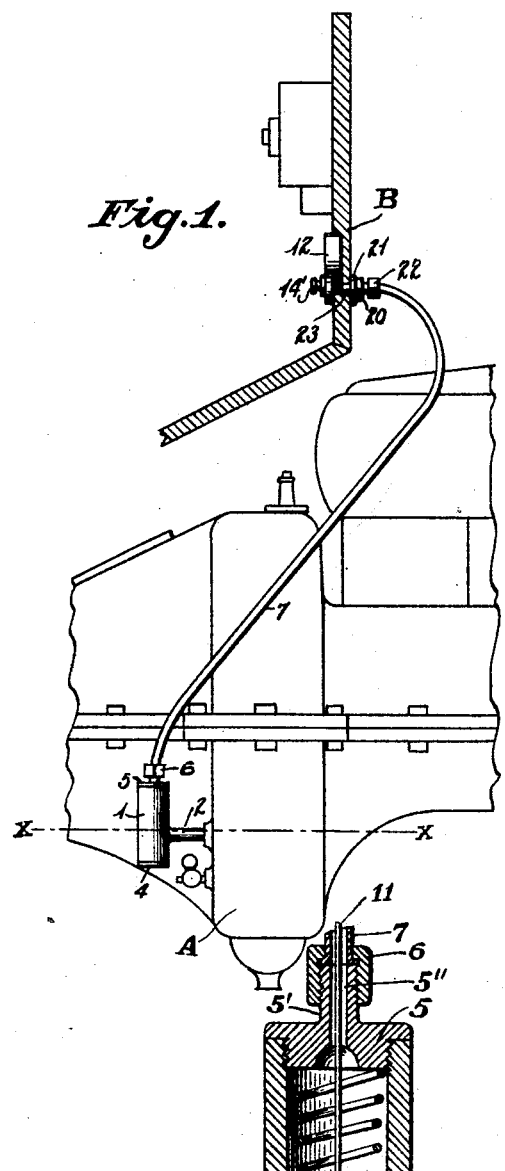
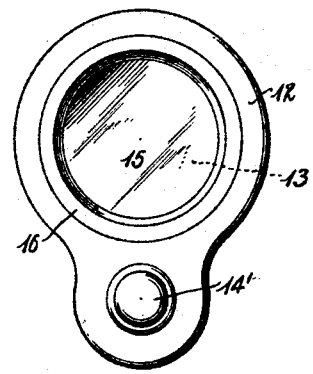
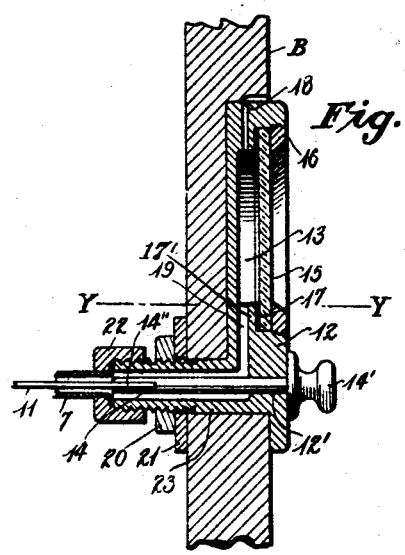
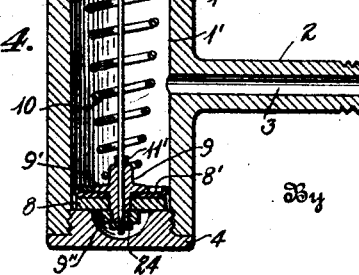

73. MEASURING AND TESTING.

Patented Nov. 18, 1930

1,781,756

UNITED STATES PATENT OFFICE

THOMAS A. HODGES, OF TULARE, CALIFORNIA, AND HENRY E. ELROD, OF DALLAS, TEXAS

OIL GAUGE

Application filed December 5, 1925. Serial No. 73,429.

Our invention relates particularly to a gauge adapted to indicate the quantity of oil, above a minimum, in the crank case or sump of an automobile engine, the indicating instrumentality being conveniently located on the instrument board of the automobile, but it may also be used in combination with any liquid reservoir to indicate the level of the liquid therein.

An embodiment of our invention will be described with reference to the accompanying drawings, in which Fig. 1 is a diagrammatic elevation of the device applied;

Fig. 2 is a face view of the indicator;

Fig. 3 is a transverse sectional view of same; and

Fig. 4 is a sectional view of a reservoir forming one element of our invention, attached to the crank case of an automobile.

Referring to Fig. 1, A represents a portion of an automobile engine crank case, the safe minimum oil level therein being indicated as $x-x$. In a Ford automobile, the top pet cock is positioned at this level, and in this make of automobile the threaded neck 2 (having a bore 3) of the cylinder 1 may be screwed into the crank case in place of the pet cock. The cylinder is preferably circular in cross section. In other makes of cars it may be necessary to provide a special threaded bore in the crank case. The cylinder 1 is provided with end caps 4 and 5, the latter having an axial, threaded extension 5′ with bore 5″. Within the cylinder 1 is a piston 8 of somewhat smaller diameter than the cylinder bore. Superposed on the piston 8 is a flexible washer 8′ which is cupped, as shown, and which acts as a valve on the down-stroke of the piston. Piston 8 has an axial bore and washer 8′ has an aperture aligning therewith; projecting through these is a tubular member 9 provided with a flange 9′ and nut 9″ between which the piston and washer are locked. A spring 10 interposed between the cap 5 and flange 9′ tends to hold the piston and washer at the bottom of the cylinder, which, as must be understood, is in a substantially vertical position.

A portion of the instrument board of the automobile is shown at B, and set into this is the indicator casing 12 (Figs. 1 and 2). In the casing 12 is a reservoir 13 having a transparent face 15, an upper vent 18, and a bottom duct 19 communicating with the tubular neck 23. The face 15 is held in place by a threaded retaining ring 16, the face abutting with its inner edge a packing ring 17 supported by the annular shoulder 17′ of the casing. Neck 23 is externally threaded and extends through the instrument board, nut 21 and lock nut 20 screwed on the former serving to retain the casing in place.

A bore 12′ in casing 12, coaxial with the tubular neck 23 receives a plunger 14 having a head 14′. A length of tubing 7 connects extension 5′ with neck 23, being secured thereto by coupling sleeves 6 and 22, respectively.

A flexible wire 11 extends through tube 7 and is fastened, as at 14″ to plunger 14 by any suitable means. Near its other end it is provided with a fixed collar 11′ abutting the top surface of member 9, while a nut 24 at its end serves to establish its fixed relation to the member 9. The element 11 forms a taut connection between piston 8 and plunger 14 so that when the latter is pulled the piston may be raised to the top of cylinder 1.

The volume of chamber 1′ is substantially equal to the combined volumes of tubing 7 and the indicator. Thus, the volume of the chamber 1′ below line $x-x$ is equal to that of the tubing 11, neck 23 and duct 19, while the volume of the chamber 1′ above line $x-x$ is equal to, or at least not greater than, the volume of reservoir 13 of the indicator. Supposing, for example, that chamber 1′ is full up to the line $x-x$; upon pulling the knob 14′, piston 8 and washer 8′ will be raised to the top of the chamber through the intermediary of wire 11, the action being that of a lift pump. The oil in the chamber will thus be lifted and forced into tubing 7 so that the system will be filled up to the line $y-y$. If the oil level in chamber 1′ is above line $x-x$, the volume above that line will enter chamber 13 and will be visible through face 15 so that an accurate indication of the quantity of oil in the crank case will be given. If the oil in chamber 1' is below line x—x, none will, of course, be raised into the indicator.

It is believed that the manner of installing the improved gauge will be obvious and need not be explained in detail. Changes in structure from that shown and described will suggest themselves to those skilled in the art; we desire to secure such structure as may come within the purview of the following claims.

We claim:

1. In combination with a liquid reservoir, a cylinder, the upper end of said cylinder being above the intended maximum level of the liquid in the reservoir, connecting means between said reservoir and said cylinder whereby the liquid level in said cylinder is maintained on a par with that in said reservoir, an indicating chamber having a transparent wall, a conduit connecting said cylinder to said indicating chamber, a piston in said cylinder, and means for actuating said piston to force the liquid from said cylinder into said conduit and said indicating chamber.

2. In combination with a liquid reservoir, a cylinder, connecting means between said reservoir and said cylinder whereby the liquid level in said cylinder is maintained on a par with that in said reservoir, said cylinder extending above the minimum desirable liquid level in said reservoir, an indicating chamber having a transparent wall, a conduit connecting said cylinder to said indicating chamber, and means for transferring a quantity of liquid from said cylinder substantially equal to the quantity of liquid in said cylinder above said minimum level to said indicating chamber via said conduit.

3. In combination with a liquid reservoir, a cylinder, connecting means between said cylinder and said liquid reservoir whereby the liquid level in said cylinder is maintained on a par with that in said reservoir, an indicating chamber having a transparent wall, a conduit connecting said cylinder to said indicating chamber, a piston in said cylinder, a plunger at the indicator end of said conduit, and means within said conduit connecting said plunger to said piston.

4. In combination with a liquid reservoir, a cylinder, connecting means between said cylinder and said liquid reservoir whereby the liquid level in said cylinder is maintained on a par with that in said reservoir, an indicating chamber having a transparent wall, a conduit connecting said cylinder to said indicating chamber, a piston in said cylinder, a plunger at the indicator end of said conduit, means within said conduit connecting said plunger to said piston, and yieldable means tending to hold said piston at the end of said cylinder remote from said conduit.

5. A device for indicating the amount of liquid in a reservoir above a minimum level comprising a cylinder communicating with the reservoir and extending above and below said minimum level, an indicating chamber having a transparent wall, a conduit connecting said indicating chamber to one end of said cylinder, a piston normally at the end of said cylinder remote from said conduit, and means for moving said piston to the conduit end of said cylinder, the proportions being such that the quantity of liquid in said cylinder below said minimum level is just sufficient to fill said conduit when the piston is moved to the conduit end of the cylinder.

The foregoing specification signed by THOMAS A. HODGES at Tulare, Calif., the 28th day of August, 1925.

THOS. A. HODGES.

The foregoing specification signed by HENRY E. ELROD at Dallas, Texas, this 19th day of August, 1925.

HENRY E. ELROD.